(12) United States Patent
Balugu et al.

(10) Patent No.: US 12,425,302 B1
(45) Date of Patent: Sep. 23, 2025

(54) SCHEMA REPOSITORY

(71) Applicant: Juniper Networks, Inc., Sunnyvale, CA (US)

(72) Inventors: Ravindhar Balugu, Bangalore (IN); Bhaskar T. Reddy, Bangalore (IN); Chandrasekhar A, Bengaluru (IN)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

(21) Appl. No.: 18/397,334

(22) Filed: Dec. 27, 2023

(51) Int. Cl.
*H04L 41/084* (2022.01)

(52) U.S. Cl.
CPC .................. *H04L 41/084* (2013.01)

(58) Field of Classification Search
CPC ...................................... H04L 41/084
See application file for complete search history.

(56) References Cited

U.S. PATENT DOCUMENTS

| | | | | |
|---|---|---|---|---|
| 8,156,213 B1* | 4/2012 | Deng | .................... | H04L 41/084 709/224 |
| 8,380,833 B2* | 2/2013 | De Matteis | ......... | H04L 41/0843 709/221 |
| 8,959,194 B1* | 2/2015 | Deng | .................... | H04L 41/084 709/224 |
| 10,148,506 B1* | 12/2018 | Anburose | ........... | H04L 41/0853 |
| 2004/0049566 A1* | 3/2004 | Mattila | ............... | H04L 41/0233 709/223 |
| 2012/0303758 A1* | 11/2012 | Anbarasan | .......... | H04L 41/0266 709/218 |
| 2021/0105338 A1* | 4/2021 | Oyman | ................... | H04L 67/61 |
| 2023/0370866 A1* | 11/2023 | Fazal | .................... | H04L 41/084 |
| 2024/0333592 A1* | 10/2024 | Morrison | .............. | H04L 41/084 |

* cited by examiner

*Primary Examiner* — Richard G Keehn
(74) *Attorney, Agent, or Firm* — Harrity & Harrity, LLP (57) ABSTRACT

In some implementations, a device may receive an indication of one or more schema parameter values associated with a network device. The device may perform a lookup, in a repository configured to store a plurality of schema parameter values associated with a plurality of schema indications, for a schema indication based on the one or more schema parameter values associated with the network device.

20 Claims, 7 Drawing Sheets

SCHEMA REPOSITORY

BACKGROUND

Network management systems (NMS) primarily manage the configuration of network functions supported by one or more vendors. Some NMSs may provide cloud-based security management and monitoring solutions. For example, an NMS may provide critical security feature and configuration provisioning for security devices, such as firewall policies, network address translation (NAT), internet protocol (IP) security (IPsec), and/or advanced security features (e.g., unified threat management (UTM), intrusion detection and prevention (IDP), advanced threat protection (ATP), threat intelligence, or the like).

SUMMARY

Some implementations described herein relate to a method. The method may include receiving, by a device, an indication of one or more schema parameter values associated with a network device. The method may include performing, by the device, a lookup, in a repository configured to store a plurality of schema parameter values associated with a plurality of schema indications, for a schema indication based on the one or more schema parameter values associated with the network device.

Some implementations described herein relate to a device. The device may include one or more memories and one or more processors. The one or more processors may be to perform a lookup, in a repository configured to store a plurality of schema parameter values associated with a plurality of schema indications, for a schema indication based on one or more schema parameter values associated with a network device. The one or more processors may be to cause the repository to be updated based on the lookup.

Some implementations described herein relate to a non-transitory computer-readable medium that stores a set of instructions. The set of instructions, when executed by one or more processors of a device, may cause the device to receive an indication of one or more schema parameter values associated with a network device. The set of instructions, when executed by one or more processors of the device, may cause the device to perform a lookup, in a repository configured to store a plurality of schema parameter values associated with a plurality of schema indications, for a schema indication based on the one or more schema parameter values associated with the network device. The set of instructions, when executed by one or more processors of the device, may cause the device to cause the repository to be updated based on the lookup.

DETAILED DESCRIPTION

The following detailed description of example implementations refers to the accompanying drawings. The same reference numbers in different drawings may identify the same or similar elements.

A "schema" defines the structure and format of a configuration objects of a network device. Historically, schemas were available in extensible markup language (XML) schema definition (XSD), JavaScript object notation (JSON) and (more recently) yet another next generation (YANG) formats. YANG-formatted schemas are commonly accepted across vendors. NMSs can rely on schemas to configure network features. For example, instead of pushing the whole configurations (which can be prohibitively large), NMSs can use schemas to generate smaller, delta configurations. NMSs can use YANG schemas to accurately provision configurations, which may ensure the accuracy of the generated configuration before the network device (e.g., security device) is deployed.

Today, network administrators and/or site reliability engineers (SREs) upload schemas to the NMS. After the schemas are made available in the NMS, a network administrator or an SRE analyzes an extensive list of network device inventory and maps each network device with an appropriate schema. This manual process for generating schemas can be error prone, leading to mismanagement of the schemas. For example, the NMS may miss certain schema versions, fail to deploy configurations due to unavailable matching schema on the NMS (which can lead to incomplete configurations on the network devices), provision unsupported configurations on the network devices (which can cause unexpected behaviors in the network devices), or the like. Additionally, or alternatively, the manual process for generating schemas can involve cumbersome efforts to generate, maintain, and/or upgrade the schema versions. Thus, the NMS management may involve significant inaccurate configuration deployment, errors, network malfunctions, network downtime, or the like. Furthermore, the NMS stores schema information on a per-network-device basis, which can introduce additional overhead, consume excessive memory and computing resources, or the like. Moreover, the NMS downloads identical schema information from identical network devices, which can consume excessive bandwidth and other resources.

Some implementations described herein enable automated schema discovery using a schema repository (e.g., a data model). For example, upon detecting that a network device has been added, the NMS may initiate schema discovery depending on whether the NMS can re-use schema information that has been previously discovered, if available. As a result, the NMS may retrieve the schema information, from the schema repository, corresponding to a network device for all modules of configurations (if available in the schema repository). If information for a schema is not already stored in the schema repository, then the NMS may retrieve an indication of the schema file from the network device and process and store the information (e.g., discovered schema information) in the schema repository. For example, the NMS may trigger the automated schema discovery at the end of a network device discovery workflow or job for managing the network device (e.g., as a task). Thus, the NMS may generate the schema (e.g., the YANG schema) information as part of network device management.

In some examples, the schema repository may be a database or other form of storage that stores a unique entry for each network device. For example, each entry may include a schema version, a device family, a device model, a device version, a vendor, or the like. In some examples, the schema repository may be common for multiple (e.g., all) network devices managed by the NMS.

As a result, the schema repository may enable accurate, automated schema management and seamless deployment. Using the schema repository as described herein may avoid the manual process of adding and/or deleting schemas and/or manually updating schema mappings. Avoiding manual intervention may reduce manual errors, error scenarios, support (e.g., SRE) cases, incomplete configurations, incompatible schema versions, unsupported configuration nodes, and overall manual efforts. For example, the schema repository may enable NMSs to accurately provision target network services. Thus, the NMS may implement configuration management in timely and accurate manner, thereby avoiding chaotic consequences. Furthermore, being common to multiple network devices, the schema repository may reduce overhead and consumption of resources (e.g., memory and/or computing resources) compared to schema information that is stored on a per-network-device basis. Moreover, the NMS may use the schema repository to avoid unnecessarily downloading schema information, thereby reducing consumption of bandwidth and other resources. For example, the NMS may avoid downloading schema information for a network device if schema information for the network device is already stored in the schema repository. In some examples, the NMS may use the schema service enabled by the schema repository without implementing additional logic (e.g., logic to determine the nearest matching schema, default schema, or the like), which may reduce consumption of memory and/or computing resources and improve the speed of the NMS. After beginning management of the network device and discovering the schema, the NMS may use the discovered schema for provisioning of network functions (e.g., firewall, NAT, IPSec, or the like) to generate optimal and accurate configuration changes to the network devices.

Figure 1:
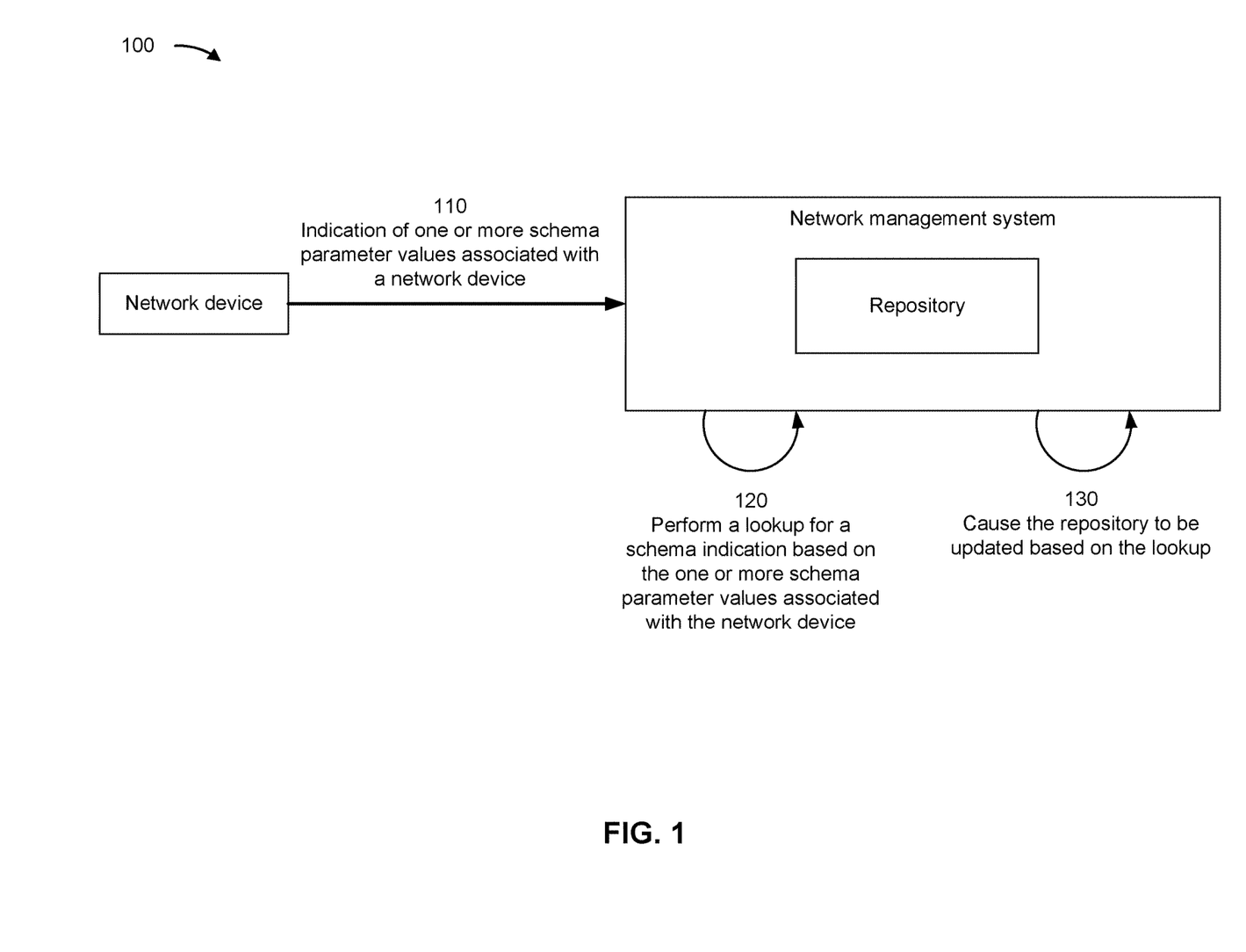
FIG. 1 is a diagram of an example implementation associated with a schema repository.

FIG. 1 is a diagram of an example implementation 100 associated with a schema repository. As shown in FIG. 1, example implementation 100 includes a network device (e.g., a security device) and an NMS. These devices are described in more detail below in connection with FIG. 4 and FIG. 5.

As shown by reference number 110, the network device may transmit, and the NMS may receive, an indication of one or more schema parameter values associated with a network device. The one or more schema parameter values may include one or more values for a network device version parameter (e.g., an operating system (OS) version parameter), a network device family parameter (e.g., a family of network devices that the network device belongs to), a network device model parameter (e.g., a model of the network device), a network device vendor parameter (e.g., a vendor of the network device), or the like. In some examples, the NMS may retrieve the one or more schema parameter values from the network device.

As shown by reference number 120, the NMS may perform a lookup, in a repository, for a schema indication based on the one or more schema parameter values associated with the network device. The repository (e.g., a schema repository) may be configured to store a plurality of schema parameter values associated with a plurality of schema indications. In some aspects, the plurality of schema parameter values may include a plurality of network device version parameter values, a plurality of network device family parameter values, a plurality of network device model parameter values, a plurality of network device vendor parameter values, or the like. Additionally, or alternatively, the repository may store the plurality of schema indications (e.g., schema universally unique identifier (UUID)). The plurality of schema parameter values may be associated with a plurality of schema indications in that the repository may map (e.g., correlate) combinations of the schema parameter values with respective schema indications.

In some aspects, the repository may be further configured to store one or more counts of network devices that are associated with one or more respective combinations of the plurality of schema parameter values. For example, a count may be a reference count that represents a quantity of network devices, detected by the NMS, that are associated with the same combination of schema parameter values.

In some aspects, the repository may be further configured to store one or more indications of one or more times that are associated with one or more respective combinations of the plurality of schema parameter values. For example, an indication of a time may be associated with a combination of the plurality of schema parameter values in that the indication may indicate a time that a network device associated with the combination of schema parameter values was last retrieved or used by the NMS.

In some aspects, the NMS may discover the network device and perform the lookup in response to discovering the network device. For example, the NMS may trigger a schema discovery process in response to the network device being added to the NMS. The network device may be a previously unused network device, a return material authorization (RMA) network device, or the like.

In some aspects, the NMS may determine that a change to the one or more schema parameter values has occurred and perform the lookup in response to determining that the change has occurred. For example, the NMS may trigger a schema discovery process in response to an OS of the network device being upgraded or downgraded. The network device may have been previously managed by the NMS.

In some aspects, the repository may be associated with a plurality of tenants. The repository may be associated with the plurality of tenants in that the repository may be configured to store network devices that are used by respective tenants. For example, the repository may be a common repository configured to store all network devices managed by the NMS (e.g., including network devices used by different tenants). For example, the NMS may be a multi-tenancy NMS.

In some aspects, the NMS may identify the schema indication based on one or more schema parameter values of the plurality of schema parameter values being identical to the one or more schema parameter values associated with the network device. For example, the NMS may identify an exact schema match between the one or more schema parameter values associated with the network device and a combination the plurality of schema parameter values stored in the repository. For example, the NMS may perform the lookup using the values received from the network device (e.g., the network device version parameter value, the network device family parameter value, the network device model parameter value, the network device vendor parameter value, or the like), and the NMS may identify an entry in the repository that contains the same schema parameter values and the schema indication that is mapped to the schema parameter values.

In some aspects, the NMS may identify the schema indication based on one or more schema parameter values of the plurality of schema parameter values differing from the one or more schema parameter values associated with the network device by less than a threshold. For example, the NMS may identify a closest schema match to the network device. The NMS may identify the closest schema match as a fallback mechanism (e.g., in case an exact schema match cannot be extracted from the network device). For example, NMS may search for a longest match of schema parameter values (e.g., network device version parameter value, network device family parameter value, network device model parameter value, network device vendor parameter value, or the like). In some examples, if the NMS cannot identify a closest match, then the NMS may repeat the schema discovery process. For example, a user (e.g., a network administrator, SRE, or the like) may re-trigger schema discovery.

In some aspects, the NMS may identify the schema indication based on a network device version value of the plurality of schema parameter values differing from a network device version value associated with the network device by less than the threshold. For example, the network device version value may indicate a major release version value and a minor release version value, where a major release introduces new configurations (e.g., new features) to the network device software and a minor release resolves performance issues, improves operation at scale, fixes bugs, or the like. In some examples, the network device version value may have a format (e.g., version stamp) of <YY>.<Quarter (1 . . . 4)>.<Major Release (R1 . . . . RN)>.<Minor/Special-Release (1 . . . . N)>, where <YY> is a year of the release, <Quarter (1 . . . 4)> is the quarter (e.g., within a year) of the release, <Major Release (R1 . . . . RN)> is the major release value, and <Minor/Special-Release (1 . . . . N)> is the minor release value. For example, a network device version value may be Y1.Q1RM1.m1, meaning that the release occurred in year Y1 and quarter Q1, and the release is for major release version RM1 and minor release version m1.

In some examples, the NMS may identify the closest schema match that has the same major release as the network device. For example, the NMS may receive an indication of the network device version value from the network device subject to discovery and identify, using closest match logic, the schema indication that most closely matches the network device. The NMS may identify the schema indication that has the longest match with the network device version and matches the network device version up to the major release value. For example, an NMS may apply a schema corresponding to a network device version value of Y1.Q1RM1.m1 to a network device having a network device version value of Y1.Q1RM1.m3 because the network device version values match up to RM1. Specific implementations may vary depending on vendor release guidelines.

The following pseudocode provides an example implementation for the closest match case.

```
BEGIN
INITIATE DISCOVERY
RETRIEVE - DEVICE VERSION, SERIES, MODEL AND VENDOR DETAILS
        RETRIEVE SCHEMA FROM DEVICE
IF RETRIEVAL OF SCHEMA IS FAILED
        DEFINE CLOSEST_MATCHING AS NONE
        DETERMINE THE DEVICE OS VERSION MAJOR
        DETERMINE THE DEVICE TYPE
                GET THE LIST OF SCHEMAS OF MATCHING FAMILY, VENDOR,
TYPE
                BEGIN FOR LOOP - RUN THROUGH THE LIST OF
SCHEMAS_PROBABLE
                        IF THE DEVICE_OS_VERSION_MAJOR IS IN
SCHEMA_VERSION
                                CLOSEST_MATCHING SCHEMA FOUND AND SET
                                BREAK
                        ELSE
                                CONTINUE THROUGH THE LIST OF
                        SCHEMAS_PROBABLE
                END FOR
                IF CLOSEST_MATCHING IS SET
                        UPDATE THE SCHEMA REPOSITORY AND DEVICE WITH
                CLOSEST_MATCHING
                ELSE
                        MARK THE STATUS AS FAILURE
        ELSE
                UPDATE THE SCHEMA REPOSITORY AND DEVICE WITH RETRIEVED
SCHEMA
END IF
END
```

As shown by reference number 130, the NMS may cause the repository to be updated based on the lookup. The NMS may cause the repository to be updated by updating the repository directly or prompting an intermediary device to update the repository. For example, if the repository does not already map the schema indication to the schema parameter values of the network device, then the NMS may cause an entry to be added to the repository (e.g., where the entry maps the schema indication to the schema parameter values of the network device). If the repository already maps the schema indication to the schema parameter values of the network device, then the NMS may cause the entry that maps the schema indication to the schema parameter values of the network device to be updated. For example, the NMS may update a reference count in the entry (e.g., by incrementing the reference count by one), an indication of the time at which the schema indication was last retrieved or used (e.g., by resetting the indication of the time), or the like. Once the network device is managed, the NMS may refer to the schema indication for configuration features, such as security firewall management, IPSec virtual private network (VPN) management, provisioning services, or the like.

An example data model involving a schema repository is described as follows with reference to Tables 1-7. Table 1 shows an example schema table with no entries.

TABLE 1

| Schema UUID | Version | Device Family | Device Model | Vendor | Last Retrieved/Used |
|---|---|---|---|---|---|

Table 2 shows an example network-device-to-schema mapping.

TABLE 2

| Device UUID | Version | Device Family | Device Model | Vendor | Schema Reference (UUID) | Last Retrieved/Used |
|---|---|---|---|---|---|---|
| Device-xxx | Y1.Q1RM1.m1 | Family-1 | Model-XXX | Vendor1 | Schema-XXXXX | |

Initially, the NMS may have no managed network devices, as shown in Table 1 above (e.g., the data model may be empty). A user may begin managing a network device (e.g., a Model-1 network device with version Y1.Q1RM1.m1), and the NMS may perform initial discovery using the schema discovery task. For example, the NMS may retrieve the schema parameter values of the network device and save the schema parameter values in the schema repository. Table 3 below shows a corresponding entry in the schema repository.

TABLE 3

| Device UUID | Version | Device Family | Device Model | Vendor | Reference count | Last Retrieved/Used |
|---|---|---|---|---|---|---|
| abcd-efgh-ijkl-mnop | Y1.Q1RM1.m1 | Family-1 | Model-1 | Vendor1 | 1 | |

As shown in Table 4 below, if the user discovers another Model-1 network device with version Y1.Q1RM1.m1, then the NMS may update the reference count in the entry. The NMS may refrain from creating a new entry in the schema repository.

TABLE 4

| Device UUID | Version | Device Family | Device Model | Vendor | Reference count | Last Retrieved/Used |
|---|---|---|---|---|---|---|
| abcd-efgh-ijkl-mnop | Y1.Q1RM1.m1 | Family-1 | Model-1 | Vendor1 | 2 | |

As shown in Table 5 below, if the user discovers a network device having a different version and/or of a different model (e.g., a Model-2 network device with version Y2.Q2RM2.m2), then the NMS may retrieve, from the network device, an indication of the schema for the network device, store the schema indication in the repository, and add an entry in the repository corresponding to the schema indication.

TABLE 5

| Schema UUID | Version | Device Family | Device Model | Vendor | Reference count | Last Retrieved/ Used |
|---|---|---|---|---|---|---|
| abcd-efgh-ijkl-mnop | Y1.Q1RM1.m1 | Family-1 | Model-1 | Vendor1 | 2 | |
| bcda-fghe-jkli-nopm | Y2.Q2RM2.m2 | Family-1 | Model-2 | Vendor1 | 1 | |

If one of the Model-1 network devices with version Y1.Q1RM1.m1 is upgraded to version Y1.Q2RM3.m3, then the NMS may determine whether an entry containing version Y1.Q2RM3.m3 (and Family-1, Model-1, and Vendor1) is already present in the schema repository. If such an entry is already present in the schema repository, then the NMS may refrain from adding any entries in the schema repository based on the upgrade. In the example of Table 6, the NMS may determine that such an entry is not present in the schema repository, retrieve the schema indication for the upgraded network device, and add a corresponding entry. The NMS may also determine that at least one Model-1 network device with version Y1.Q1RM1.m1 is still present and decrement reference count in the corresponding entry by one.

TABLE 6

| Schema UUID | Version | Device Family | Device Model | Vendor | Reference count | Last Retrieved/ Used |
|---|---|---|---|---|---|---|
| abcd-efgh-ijkl-mnop | Y1.Q1RM1.m1 | Family-1 | Model-1 | Vendor1 | 1 | |
| bcda-fghe-jkli-nopm | Y2.Q2RM2.m2 | Family-1 | Model-2 | Vendor1 | 1 | |
| cdab-ghef-klij-opmn | Y1.Q2RM3.m3 | Family-1 | Model-1 | Vendor1 | 1 | |

As shown in Table 7 below, the other Model-1 network device with version Y1.Q1RM1.m1 may also be upgraded to Y1.Q2RM3.m3, and the NMS may increment the reference count for Model-1 network devices with version Y1.Q2RM3.m3 to two and/or update the corresponding last retrieved/used time. Additionally, or alternatively, the NMS may decrement the reference count for Model-1 network devices with version Y1.Q1RM1.m1 to zero and/or update the last retrieved/used time. In some examples, the NMS may delete the entry for Model-1 network devices with version Y1.Q1RM1.m1 because the schema UUID corresponding to such network devices is now unused.

TABLE 7

| Schema UUID | Version | Device Family | Device Model | Vendor | Reference count | Last Retrieved/ Used |
|---|---|---|---|---|---|---|
| abcd-efgh-ijkl-mnop | Y1.Q1RM1.m1 | Family-1 | Model-1 | Vendor1 | 0 | |
| bcda-fghe-jkli-nopm | Y2.Q2RM2.m2 | Family-1 | Model-2 | Vendor1 | 1 | |
| cdab-ghef-klij-opmn | Y1.Q2RM3.m3 | Family-1 | Model-1 | Vendor1 | 2 | |

As indicated above, FIG. 1 is provided as an example. Other examples may differ from what is described with regard to FIG. 1. The number and arrangement of devices shown in FIG. 1 are provided as an example. In practice, there may be additional devices, fewer devices, different devices, or differently arranged devices than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) shown in FIG. 1 may perform one or more functions described as being performed by another set of devices shown in FIG. 1.

Figure 2:
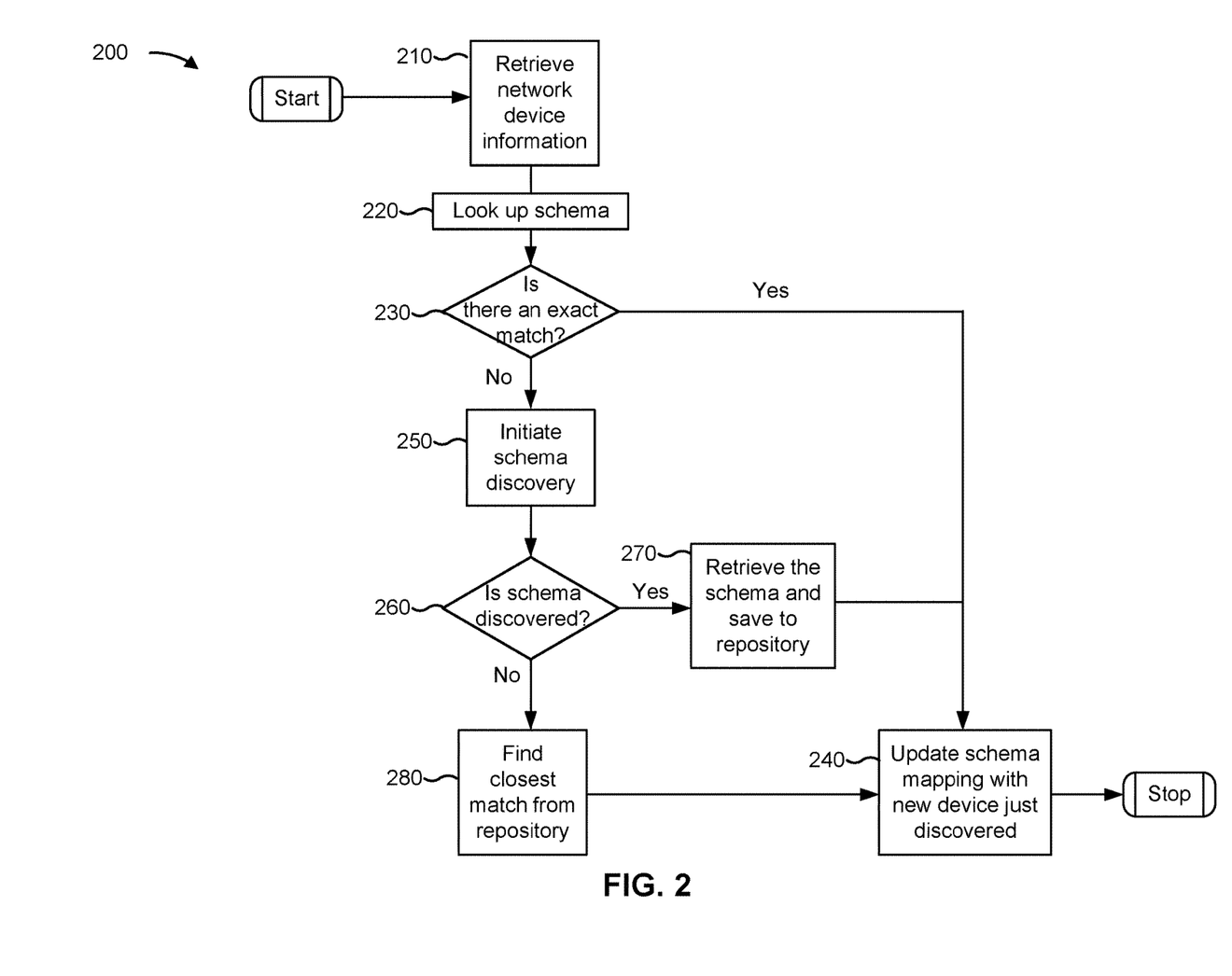
FIG. 2 is a diagram of a flowchart associated with schema discovery and mapping.

FIG. 2 is a diagram of a flowchart 200 associated with schema discovery and mapping.

As shown by reference number 210, the NMS may receive an indication of one or more schema parameter values associated with a network device. The network device may be newly discovered. For example, the NMS may retrieve network device information from a network device. The network device information may include an indication of one or more schema parameter values (e.g., OS version, family, vendor, or the like).

As shown by reference number 220, the NMS may perform a lookup, in a repository configured to store a plurality of schema parameter values associated with a plurality of schema indications, for a schema indication based on the one or more schema parameter values associated with the network device.

As shown by reference number 230, the NMS may selectively identify a schema indication based on one or more schema parameter values of the plurality of schema parameter values being identical to one or more schema parameter values associated with the network device (e.g., the NMS may determine whether there is an exact match).

For example, as shown by reference number 240, if the NMS identifies the schema indication based on an exact match, then the NMS may update the schema mapping in the repository based on the network device.

As shown by reference number 250, the NMS may selectively perform schema discovery based on selectively identifying the schema indication. For example, if the NMS does not identify the schema indication based on an exact match, then the NMS may initiate schema discovery. For example, the NMS may send a command to the network device. The command may prompt the network device to send an indication of the schema to the NMS.

As shown by reference number 260, the NMS may determine whether the schema has been discovered (e.g., whether the schema discovery was successful). For example, the NMS may determine whether the NMS has received the indication of the schema from the network device. As shown by reference number 270, if the schema discovery was successful, then the NMS may retrieve the schema indication and store the schema indication in the repository and, as shown by reference number 240, update the schema mapping in the repository based on the network device.

As shown by reference number 280, the NMS may selectively identify, based on selectively performing the schema discovery (e.g., based upon whether the schema has not been discovered), the schema indication based on one or more schema parameter values of the plurality of schema parameter values differing from the one or more schema parameter values associated with the network device by less than a threshold. For example, if the schema discovery failed, then the NMS may identify a closest match from the repository and, as shown by reference number 240, update the schema mapping in the repository based on the network device.

As indicated above, FIG. 2 is provided as an example. Other examples may differ from what is described with regard to FIG. 2.

Figure 3:
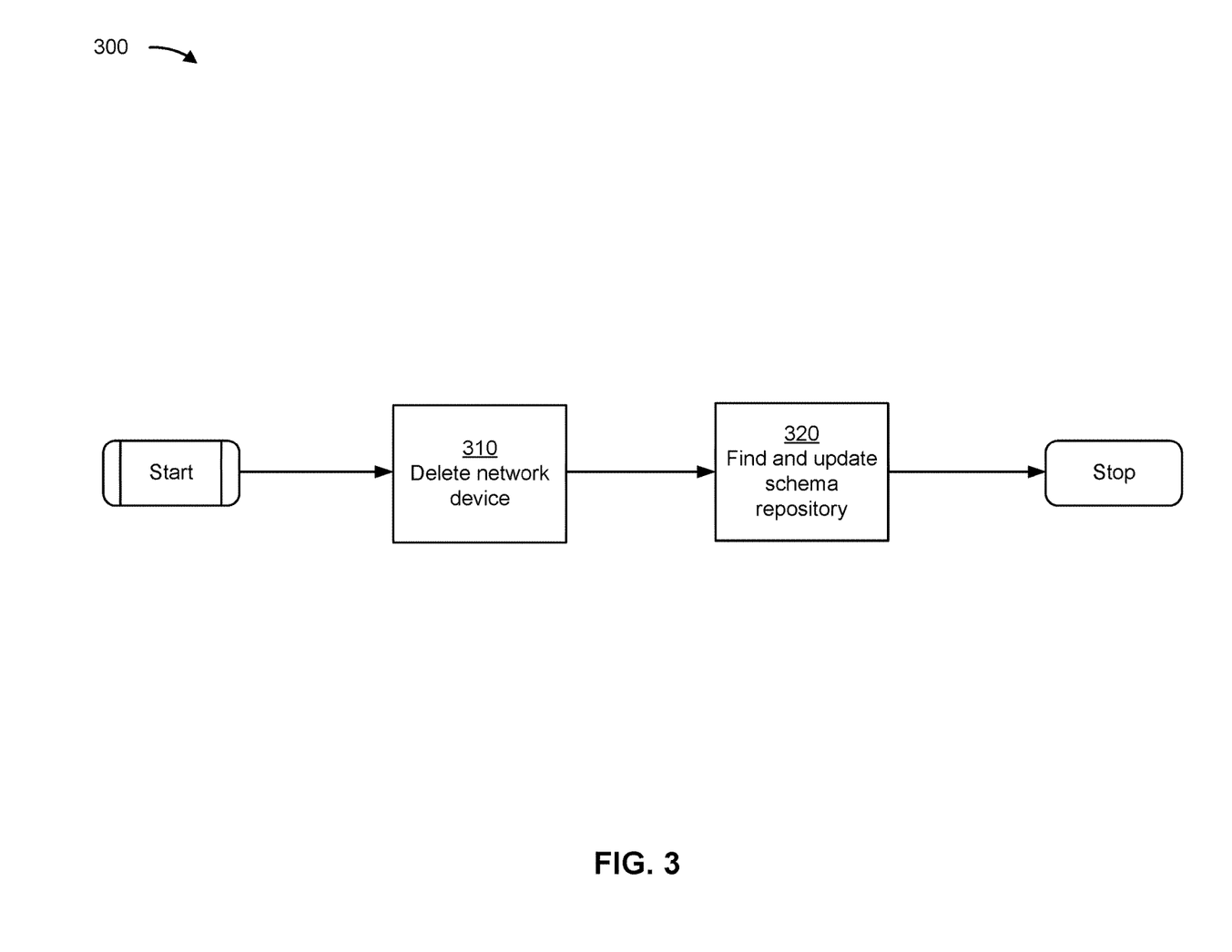
FIG. 3 is a diagram of a flowchart associated with device deletion.

FIG. 3 is a diagram of a flowchart 300 associated with device deletion.

As shown by reference number 310, the NMS may delete a network device from the NMS. For example, the network device may be removed from the NMS, upgraded or downgraded, or the like.

As shown by reference number 320, the NMS may find and update the repository. In some aspects, the NMS may determine that a count of network devices that are associated with a combination of the plurality of schema parameter values is zero. For example, the NMS may determine that a reference count of other network devices having the same schema parameters values is set to zero. For example, the NMS may determine that all such network devices have been unmanaged or deleted from the repository.

In some aspects, the NMS may delete, from the repository, based on the count being zero, an entry that contains the combination of the plurality of schema parameter values. For example, the NMS may delete the entry containing the schema indication corresponding to the unmanaged or deleted network devices. For example, the NMS may delete the entry containing the corresponding schema indication based on the NMS having no references to other network devices having the same schema parameters values (e.g., based on the reference count being set to zero).

As indicated above, FIG. 3 is provided as an example. Other examples may differ from what is described with regard to FIG. 3.

Figure 4:
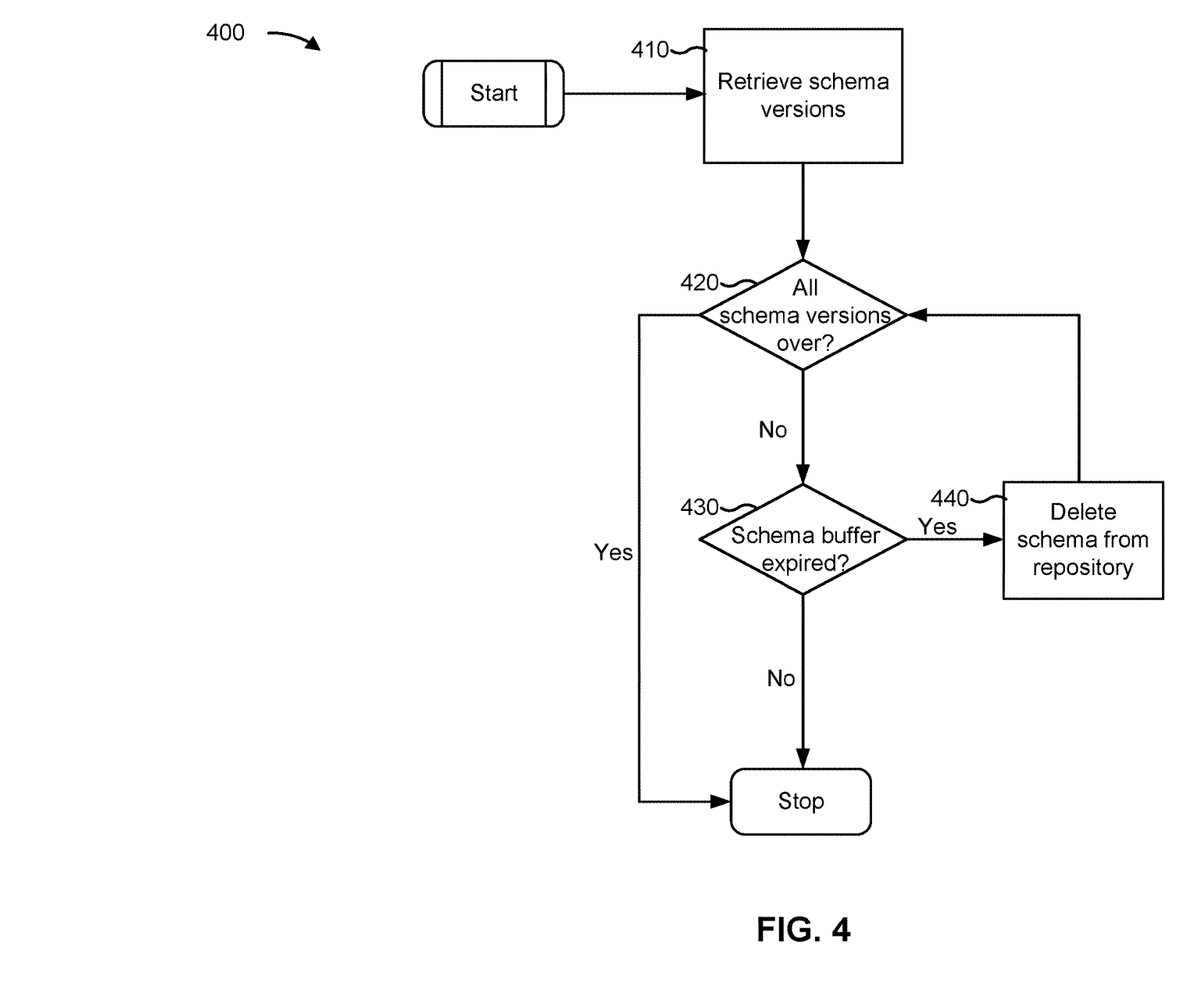
FIG. 4 is a diagram of a flowchart associated with a periodic schema purge process.

FIG. 4 is a diagram of a flowchart 400 associated with a periodic schema purge process.

As shown by reference number 410, the NMS may retrieve schema versions (e.g., schema indications). The schema versions may have corresponding reference counts. In some examples, the NMS may identify the schema indications periodically.

As shown by reference number 420, the NMS may determine whether all of the retrieved schema versions have reference counts over zero. If all of the reference counts are over zero, then the NMS may refrain from deleting any entries containing the retrieved schema versions.

As shown by reference number 430, the NMS may determine whether schema buffers for respective retrieved schema versions have expired. For example, a schema buffer (e.g., expiry timer) may be based on a time that is associated with the combination of the plurality of schema parameter values. An indication of the time may be stored in the repository in an entry and may indicate a time at which the schema indication was last used or retrieved (e.g., the indication of the time may be stored in a "last used/retrieved" column of the repository). For example, the time may be a time at which the NMS decremented the reference count for an entry to zero.

In some aspects, as shown by reference number 440, the NMS may delete the entry based on the time that is associated with the combination of the plurality of schema parameter values. For example, after the schema buffer expires, the NMS may be permitted to delete the entry. Thus, the NMS may trigger a periodic clean-up that involves examining the repository and purging one or more entries if certain thresholds are satisfied. For example, the NMS may delete the entry if the "last used" time occurred more than a threshold time window (e.g., X hours or Y days) and the reference count is equal to zero. The thresholds may be configurable as part of a schema service provided by the NMS.

As indicated above, FIG. 4 is provided as an example. Other examples may differ from what is described with regard to FIG. 4.

Performing the lookup, in the repository, for the schema indication may enable accurate, automated schema management and seamless deployment. Using the schema repository as described herein may avoid the manual process of adding and/or deleting schemas and/or manually updating schema mappings, which may reduce manual errors, error scenarios, support cases, incomplete configurations, incompatible schema versions, unsupported configuration nodes, and overall manual efforts. Furthermore, being common to multiple network devices, the schema repository may reduce overhead and consumption of resource (e.g., memory and/or computing resources) compared to schema information that is stored on a per-network-device basis. Moreover, the NMS may use the schema repository to avoid unnecessarily downloading schema information, thereby reducing consumption of bandwidth and other resources. For example, the NMS may avoid downloading schema information for a network device if schema information for the network device is already stored in the schema repository. In some examples, the NMS may use the schema service enabled by the schema repository without implementing additional logic (e.g., logic to determine the nearest matching schema, default schema, or the like), which may reduce consumption of memory and/or computing resources and improve the speed of the NMS.

Identifying the schema indication based on one or more schema parameter values of the plurality of schema parameter values being identical to the one or more schema parameter values associated with the network device may result in exact schema matches, thereby reducing configuration errors. Identifying the schema indication based on one or more schema parameter values of the plurality of schema parameter values differing from the one or more schema parameter values associated with the network device by less than a threshold may result in closest schema matches, thereby enabling the NMS to configure the network device in cases where an exact schema match is unavailable, the schema cannot be discovered from the network device, or the like.

The one or more schema parameter values include a network device version value may reduce deviations, incorrect stanzas, or the like. For example, the NMS may improve stability and performance (e.g., speed) by optimizing schema management using optimized schema. For example, in cases where vendor release cycles have guidelines such that major releases involve schema changes and sub-releases (e.g., minor releases) do not involve schema changes, then the NMS may re-use schemas with matching major release versions. As a result, the NMS may reduce information stored in the repository, such as quantities of schema indications, device versions, OS versions, or the like. The NMS may also reduce the schemas that are to be discovered, which may reduce additional load on the NMS, such as in cases involving parallel configuration provisioning for multi-tenancy.

The repository being further configured to store the one or more counts of network devices that are associated with the one or more respective combinations of the plurality of schema parameter values may help to avoid duplicate entries in the repository, which may reduce resources consumed due to storing entries in the repository. For example, instead of storing duplicate entries in the repository, the NMS may refer to the count (e.g., reference count) of network devices that are associated with a given combination of schema parameter values.

Deleting the entry based on a time that is associated with the combination of the plurality of schema parameter values may reduce schema retrievals. As a result, the NMS may reduce resources (e.g., bandwidth) consumed due to retrieving schema that were recently deleted. For example, the NMS may delay deletion of an entry from the repository in case a corresponding network device is to be added shortly after the reference count decrements to zero.

Figure 5:
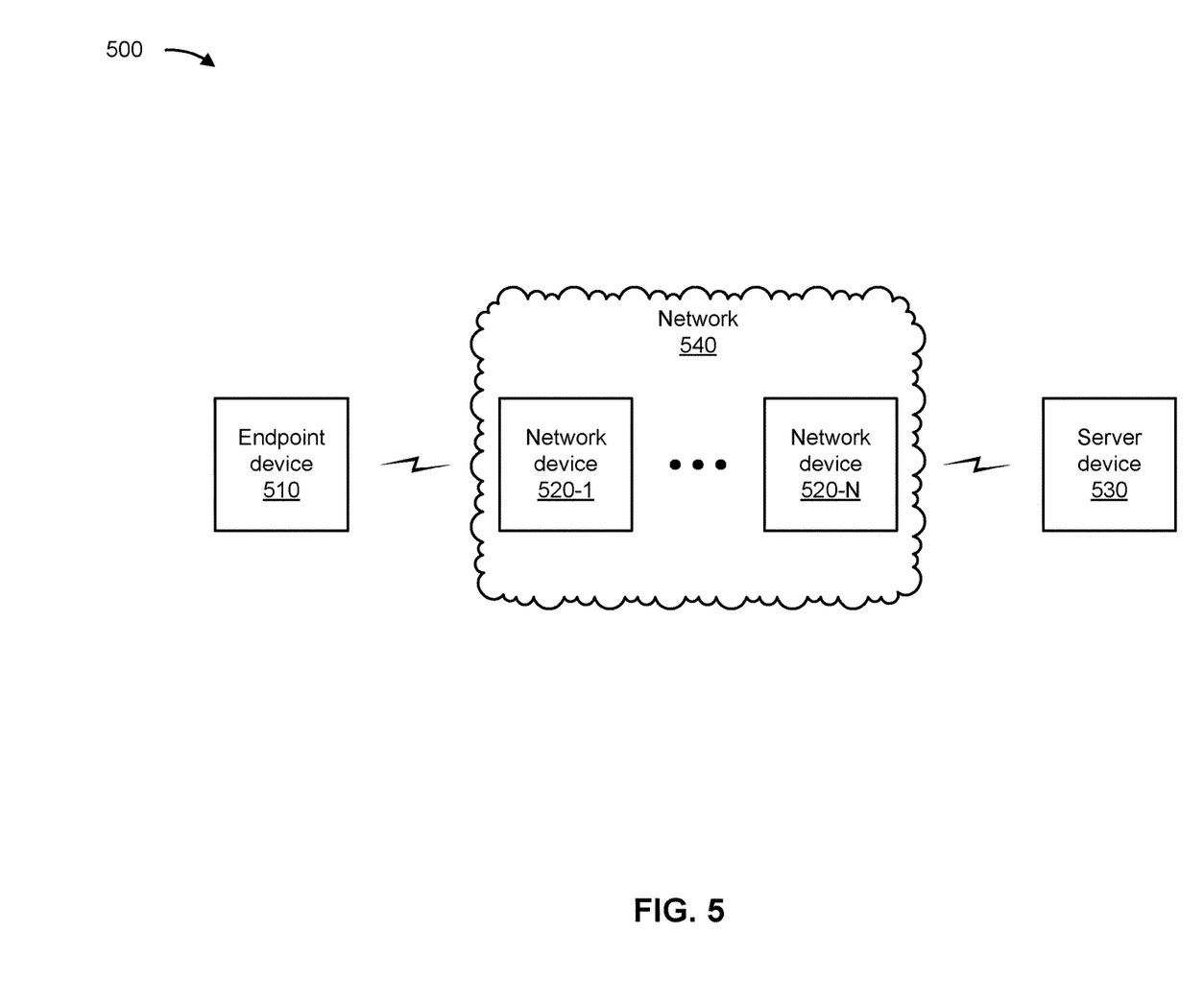
FIG. 5 is a diagram of an example environment in which systems and/or methods described herein may be implemented.

FIG. 5 is a diagram of an example environment 500 in which systems and/or methods described herein may be implemented. As shown in FIG. 5, environment 500 may include an endpoint device 510, a group of network devices 520 (shown as network device 520-1 through network device 520-N), a server device 530, and a network 540. Devices of environment 500 may interconnect via wired connections, wireless connections, or a combination of wired and wireless connections.

Endpoint device 510 includes one or more devices capable of receiving, generating, storing, processing, and/or providing information, such as information described herein. For example, endpoint device 510 may include a mobile phone (e.g., a smart phone or a radiotelephone), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, or a head mounted display), a network device, or a similar type of device. In some implementations, endpoint device 510 may receive network traffic from and/or may provide network traffic to other endpoint devices 510 and/or server device 530, via network 540 (e.g., by routing packets using network devices 520 as intermediaries).

Network device 520 includes one or more devices capable of receiving, processing, storing, routing, and/or providing traffic (e.g., a packet or other information or metadata) in a manner described herein. For example, network device 520 may include a router, such as a label switching router (LSR), a label edge router (LER), an ingress router, an egress router, a provider router (e.g., a provider edge router or a provider core router), a virtual router, or another type of router. Additionally, or alternatively, network device 520 may include a gateway, a switch, a firewall, a hub, a bridge, a reverse proxy, a server (e.g., a proxy server, a cloud server, or a data center server), a load balancer, and/or a similar device. In some implementations, network device 520 may be a physical device implemented within a housing, such as a chassis. In some implementations, network device 520 may be a virtual device implemented by one or more computer devices of a cloud computing environment or a data center. In some implementations, a group of network devices 520 may be a group of data center nodes that are used to route traffic flow through network 540.

Server device 530 includes one or more devices capable of receiving, generating, storing, processing, and/or providing information, such as information described herein. For example, server device 530 may include a laptop computer, a tablet computer, a desktop computer, a group of server devices, or a similar type of device, associated with multicast traffic. In some implementations, server device 530 may receive information from and/or transmit information (e.g., multicast traffic) to endpoint device 510, via network 540 (e.g., by routing packets using network devices 520 as intermediaries).

Network 540 includes one or more wired and/or wireless networks. For example, network 540 may include a packet switched network, a cellular network (e.g., a fifth generation (5G) network, a fourth generation (4G) network, such as a long-term evolution (LTE) network, a third generation (3G) network, a code division multiple access (CDMA) network, a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 5 are provided as an example. In practice, there may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally, or alternatively, a set of devices (e.g., one or more devices) of environment 500 may perform one or more functions described as being performed by another set of devices of environment 500.

Figure 6:
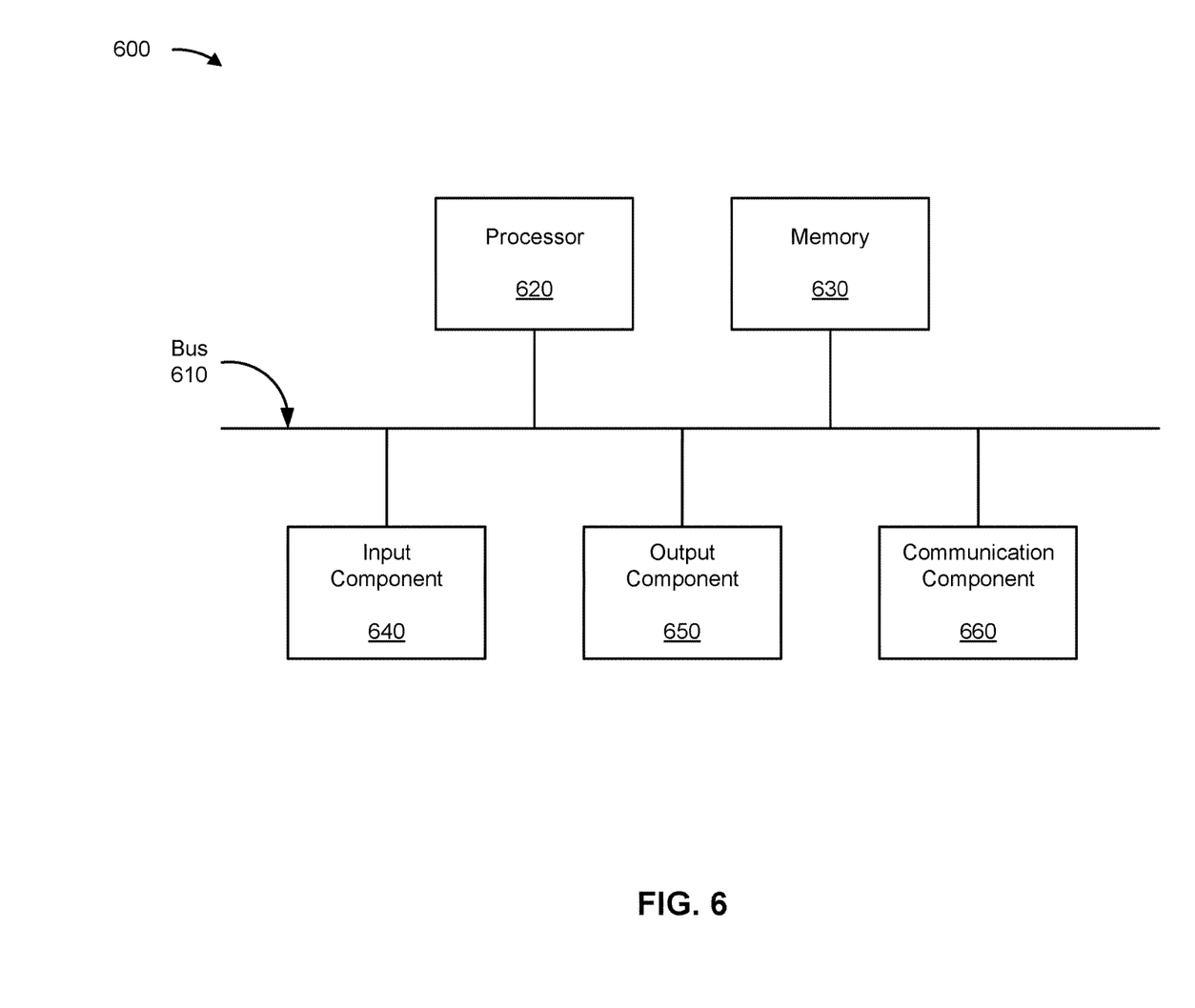
FIG. 6 is a diagram of example components of a device associated with a schema repository.

FIG. 6 is a diagram of example components of a device 600 associated with a schema repository. The device 600 may correspond to server device 530. In some implementations, server device 530 may include one or more devices 600 and/or one or more components of the device 600. As shown in FIG. 6, the device 600 may include a bus 610, a processor 620, a memory 630, an input component 640, an output component 650, and/or a communication component 660.

The bus 610 may include one or more components that enable wired and/or wireless communication among the components of the device 600. The bus 610 may couple together two or more components of FIG. 6, such as via operative coupling, communicative coupling, electronic coupling, and/or electric coupling. For example, the bus 610 may include an electrical connection (e.g., a wire, a trace, and/or a lead) and/or a wireless bus. The processor 620 may include a central processing unit, a graphics processing unit, a microprocessor, a controller, a microcontroller, a digital signal processor, a field-programmable gate array, an application-specific integrated circuit, and/or another type of processing component. The processor 620 may be implemented in hardware, firmware, or a combination of hardware and software. In some implementations, the processor 620 may include one or more processors capable of being programmed to perform one or more operations or processes described elsewhere herein.

The memory 630 may include volatile and/or nonvolatile memory. For example, the memory 630 may include random access memory (RAM), read only memory (ROM), a hard disk drive, and/or another type of memory (e.g., a flash memory, a magnetic memory, and/or an optical memory). The memory 630 may include internal memory (e.g., RAM, ROM, or a hard disk drive) and/or removable memory (e.g., removable via a universal serial bus connection). The memory 630 may be a non-transitory computer-readable medium. The memory 630 may store information, one or more instructions, and/or software (e.g., one or more software applications) related to the operation of the device 600. In some implementations, the memory 630 may include one or more memories that are coupled (e.g., communicatively coupled) to one or more processors (e.g., processor 620), such as via the bus 610. Communicative coupling between a processor 620 and a memory 630 may enable the processor 620 to read and/or process information stored in the memory 630 and/or to store information in the memory 630.

The input component 640 may enable the device 600 to receive input, such as user input and/or sensed input. For example, the input component 640 may include a touch screen, a keyboard, a keypad, a mouse, a button, a microphone, a switch, a sensor, a global positioning system sensor, a global navigation satellite system sensor, an accelerometer, a gyroscope, and/or an actuator. The output component 650 may enable the device 600 to provide output, such as via a display, a speaker, and/or a light-emitting diode. The communication component 660 may enable the device 600 to communicate with other devices via a wired connection and/or a wireless connection. For example, the communication component 660 may include a receiver, a transmitter, a transceiver, a modem, a network interface card, and/or an antenna.

The device 600 may perform one or more operations or processes described herein. For example, a non-transitory computer-readable medium (e.g., memory 630) may store a set of instructions (e.g., one or more instructions or code) for execution by the processor 620. The processor 620 may execute the set of instructions to perform one or more operations or processes described herein. In some implementations, execution of the set of instructions, by one or more processors 620, causes the one or more processors 620 and/or the device 600 to perform one or more operations or processes described herein. In some implementations, hardwired circuitry may be used instead of or in combination with the instructions to perform one or more operations or processes described herein. Additionally, or alternatively, the processor 620 may be configured to perform one or more operations or processes described herein. Thus, implementations described herein are not limited to any specific combination of hardware circuitry and software.

The number and arrangement of components shown in FIG. 6 are provided as an example. The device 600 may include additional components, fewer components, different components, or differently arranged components than those shown in FIG. 6. Additionally, or alternatively, a set of components (e.g., one or more components) of the device 600 may perform one or more functions described as being performed by another set of components of the device 600.

Figure 7:
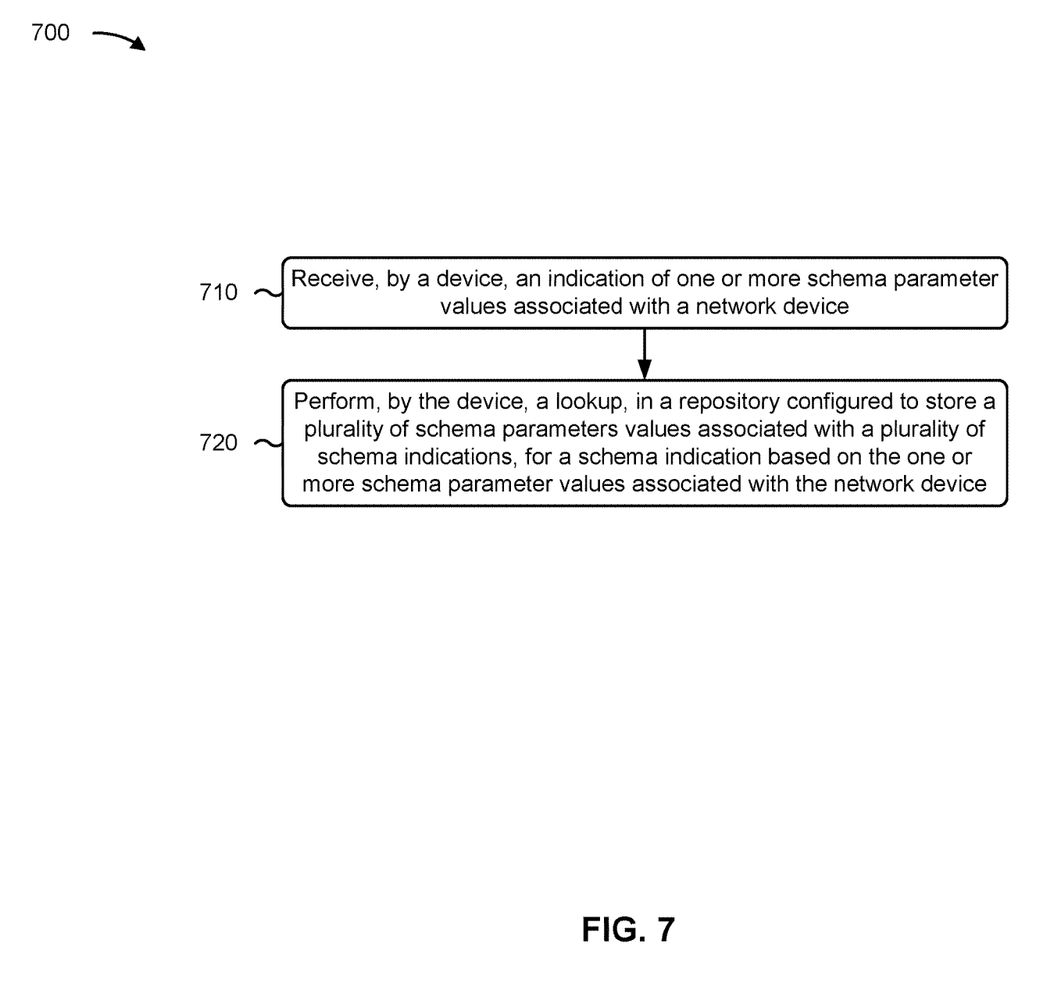
FIG. 7 is a flowchart of an example process associated with a schema repository.

FIG. 7 is a flowchart of an example process 700 associated with a schema repository. In some implementations, one or more process blocks of FIG. 7 are performed by a device (e.g., an NMS). In some implementations, one or more process blocks of FIG. 7 are performed by another device or a group of devices separate from or including the device, such as endpoint device (e.g., endpoint device 510), a network device (e.g., network device 520), and/or a server device (e.g., server device 530). Additionally, or alternatively, one or more process blocks of FIG. 7 may be performed by one or more components of device 600, such as processor 620, memory 630, input component 640, output component 650, and/or communication component 660.

As shown in FIG. 7, process 700 may include receiving an indication of one or more schema parameter values associated with a network device (block 710). For example, the device may receive an indication of one or more schema parameter values associated with a network device, as described above.

As further shown in FIG. 7, process 700 may include performing a lookup, in a repository configured to store a plurality of schema parameter values associated with a plurality of schema indications, for a schema indication based on the one or more schema parameter values associated with the network device (block 720). For example, the device may perform a lookup, in a repository configured to store a plurality of schema parameter values associated with a plurality of schema indications, for a schema indication based on the one or more schema parameter values associated with the network device, as described above.

Process 700 may include additional implementations, such as any single implementation or any combination of implementations described below and/or in connection with one or more other processes described elsewhere herein.

In a first implementation, process 700 includes identifying, by the device, the schema indication based on one or more schema parameter values of the plurality of schema parameter values being identical to the one or more schema parameter values associated with the network device.

In a second implementation, alone or in combination with the first implementation, process 700 includes identifying, by the device, the schema indication based on one or more schema parameter values of the plurality of schema parameter values differing from the one or more schema parameter values associated with the network device by less than a threshold.

In a third implementation, alone or in combination with one or more of the first and second implementations, the one or more schema parameter values include a network device version value.

In a fourth implementation, alone or in combination with one or more of the first through third implementations, the plurality of schema parameter values includes a plurality of network device version parameter values, a plurality of network device family parameter values, a plurality of network device model parameter values, and a plurality of network device vendor parameter values.

In a fifth implementation, alone or in combination with one or more of the first through fourth implementations, process 700 includes discovering the network device, and performing the lookup includes performing the lookup in response to discovering the network device.

In a sixth implementation, alone or in combination with one or more of the first through fifth implementations, process 700 includes determining that a change to the one or more schema parameter values has occurred, and performing the lookup includes performing the lookup in response to determining that the change has occurred.

In a seventh implementation, alone or in combination with one or more of the first through sixth implementations, the repository is associated with a plurality of tenants.

In an eighth implementation, alone or in combination with one or more of the first through seventh implementations, the repository is further configured to store one or more counts of network devices that are associated with one or more respective combinations of the plurality of schema parameter values.

In a ninth implementation, alone or in combination with one or more of the first through eighth implementations, the repository is further configured to store one or more indications of one or more times that are associated with one or more respective combinations of the plurality of schema parameter values.

Although FIG. 7 shows example blocks of process 700, in some implementations, process 700 includes additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, traffic or content may include a set of packets. A packet may refer to a communication structure for communicating information, such as a protocol data unit (PDU), a service data unit (SDU), a network packet, a datagram, a segment, a message, a block, a frame (e.g., an Ethernet frame), a portion of any of the above, and/or another type of formatted or unformatted unit of data capable of being transmitted via a network.

As used herein, satisfying a threshold may, depending on the context, refer to a value being greater than the threshold, greater than or equal to the threshold, less than the threshold, less than or equal to the threshold, equal to the threshold, not equal to the threshold, or the like.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

When "a processor" or "one or more processors" (or another device or component, such as "a controller" or "one or more controllers") is described or claimed (within a single claim or across multiple claims) as performing multiple operations or being configured to perform multiple operations, this language is intended to broadly cover a variety of processor architectures and environments. For example, unless explicitly claimed otherwise (e.g., via the use of "first processor" and "second processor" or other language that differentiates processors in the claims), this language is intended to cover a single processor performing or being configured to perform all of the operations, a group of processors collectively performing or being configured to perform all of the operations, a first processor performing or being configured to perform a first operation and a second processor performing or being configured to perform a second operation, or any combination of processors performing or being configured to perform the operations. For example, when a claim has the form "one or more processors to: perform X; perform Y; and perform Z," that claim should be interpreted to mean "one or more processors to perform X; one or more (possibly different) processors to perform Y; and one or more (also possibly different) processors to perform Z."

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method, comprising:
receiving, by a device, an indication of one or more schema parameter values associated with a network device;
performing, by the device, a lookup, in a repository configured to store a plurality of schema parameter values associated with a plurality of schema indications, for a schema indication based on the one or more schema parameter values associated with the network device;

causing the repository to be updated based on the lookup;

determining that a count of network devices that are associated with a combination of the plurality of schema parameter values is zero;

deleting, from the repository and based on the count being zero, an entry that contains the combination of the plurality of schema parameter values; and provisioning one or more network devices based on updated information of the repository.

2. The method of claim 1, further comprising:
identifying, by the device, the schema indication based on one or more schema parameter values of the plurality of schema parameter values being identical to the one or more schema parameter values associated with the network device.

3. The method of claim 1, further comprising:
identifying, by the device, the schema indication based on one or more schema parameter values of the plurality of schema parameter values differing from the one or more schema parameter values associated with the network device by less than a threshold.

4. The method of claim 3, wherein the one or more schema parameter values include a network device version value.

5. The method of claim 1, wherein the plurality of schema parameter values includes a plurality of network device version parameter values, a plurality of network device family parameter values, a plurality of network device model parameter values, and a plurality of network device vendor parameter values.

6. The method of claim 1, further comprising:
discovering the network device,
wherein performing the lookup includes performing the lookup in response to discovering the network device.

7. The method of claim 1, further comprising:
determining that a change to the one or more schema parameter values has occurred,
wherein performing the lookup includes performing the lookup in response to determining that the change has occurred.

8. The method of claim 1, wherein the repository is associated with a plurality of tenants.

9. The method of claim 1, wherein the repository is further configured to store one or more counts of network devices that are associated with one or more respective combinations of the plurality of schema parameter values.

10. The method of claim 1, wherein the repository is further configured to store one or more indications of one or more times that are associated with one or more respective combinations of the plurality of schema parameter values.

11. A device, comprising:
one or more memories; and
one or more processors to:
perform a lookup, in a repository configured to store a plurality of schema parameter values associated with a plurality of schema indications, for a schema indication based on one or more schema parameter values associated with a network device;
cause the repository to be updated based on the lookup;
determine that a count of network devices that are associated with a combination of the plurality of schema parameter values is zero;
delete, from the repository and based on the count being zero, an entry that contains the combination of the plurality of schema parameter values; and
provision one or more network devices based on information of the repository.

12. The device of claim 11, wherein the one or more processors are further to:
selectively identify the schema indication based on the one or more schema parameter values of the plurality of schema parameter values being identical to the one or more schema parameter values associated with the network device;
selectively perform schema discovery based on selectively identifying the schema indication; and
selectively identify, based on selectively performing the schema discovery, the schema indication based on one or more schema parameter values of the plurality of schema parameter values differing from the one or more schema parameter values associated with the network device by less than a threshold.

13. The device of claim 11, wherein the repository is further configured to store one or more counts of network devices that are associated with one or more respective combinations of the plurality of schema parameter values.

14. A non-transitory computer-readable medium storing a set of instructions, the set of instructions comprising:
one or more instructions that, when executed by one or more processors of a device, cause the device to:
receive an indication of one or more schema parameter values associated with a network device;
perform a lookup, in a repository configured to store a plurality of schema parameter values associated with a plurality of schema indications, for a schema indication based on the one or more schema parameter values associated with the network device;
cause the repository to be updated based on the lookup;
determine that a count of network devices that are associated with a combination of the plurality of schema parameter values is zero;
delete, from the repository and based on the count being zero, an entry that contains the combination of the plurality of schema parameter values; and
provision one or more network devices based on updated information of the repository.

15. The non-transitory computer-readable medium of claim 14, wherein the one or more instructions further cause the device to:
identify the schema indication based on one or more schema parameter values of the plurality of schema parameter values being identical to the one or more schema parameter values associated with the network device.

16. The non-transitory computer-readable medium of claim 14, wherein the one or more instructions further cause the device to:
identify the schema indication based on one or more schema parameter values of the plurality of schema parameter values differing from the one or more schema parameter values associated with the network device by less than a threshold.

17. The non-transitory computer-readable medium of claim 14, wherein the plurality of schema parameter values includes a plurality of network device version parameter values, a plurality of network device family parameter values, a plurality of network device model parameter values, and a plurality of network device vendor parameter values.

18. The non-transitory computer-readable medium of claim 14, wherein the one or more instructions further cause the device to:
    discover the network device,
        wherein the one or more instructions, that cause the device to perform the lookup, cause the device to perform the lookup in response to discovering the network device.

19. The non-transitory computer-readable medium of claim 14, wherein the one or more instructions further cause the device to:
    determine that a change to the one or more schema parameter values has occurred,
        wherein the one or more instructions, that cause the device to perform the lookup, cause the device to perform the lookup in response to determining that the change has occurred.

20. The non-transitory computer-readable medium of claim 14,
    wherein the repository is further configured to store one or more counts of network devices that are associated with one or more respective combinations of the plurality of schema parameter values.

\* \* \* \* \*